US008750426B2

(12) United States Patent
Casagrande et al.

(10) Patent No.: US 8,750,426 B2
(45) Date of Patent: Jun. 10, 2014

(54) FSK MODULATION SIGNAL RECEIVER WITH HIGH SENSITIVITY IN LOW RATE MODE

(75) Inventors: Arnaud Casagrande, Bole (CH); Carlos Velasquez, Neuchatel (CH); Emil Zellweger, Lommiswil (CH)

(73) Assignee: The Swatch Group Research and Development Ltd, Marin (CH)

( * ) Notice: Subject to any disclaimer, the term of this patent is extended or adjusted under 35 U.S.C. 154(b) by 1069 days.

(21) Appl. No.: 12/755,111

(22) Filed: Apr. 6, 2010

(65) Prior Publication Data
US 2010/0255799 A1  Oct. 7, 2010

(30) Foreign Application Priority Data

Apr. 7, 2009  (EP) ..................................... 09157506

(51) Int. Cl.
*H04L 27/14* (2006.01)
(52) U.S. Cl.
USPC .......................................... 375/334; 375/331
(58) Field of Classification Search
USPC ......... 375/316, 323, 324, 326, 334, 331, 332, 375/339, 327
See application file for complete search history.

(56) References Cited

U.S. PATENT DOCUMENTS

| 4,628,518 | A | | 12/1986 | Chadwick et al. | |
|---|---|---|---|---|---|
| 5,504,785 | A | * | 4/1996 | Becker et al. ................. | 375/344 |
| 5,668,837 | A | | 9/1997 | Dent | |
| 6,342,123 | B1 | * | 1/2002 | Rees et al. ..................... | 156/282 |
| 7,729,317 | B2 | * | 6/2010 | Payne et al. ................... | 370/334 |
| 2002/0049075 | A1 | * | 4/2002 | Takagi .......................... | 455/553 |
| 2002/0127972 | A1 | * | 9/2002 | Marshall et al. ............... | 455/78 |
| 2003/0181187 | A1 | * | 9/2003 | Liu ............................... | 455/302 |
| 2004/0018825 | A1 | * | 1/2004 | Wagner et al. ................ | 455/307 |
| 2004/0147238 | A1 | * | 7/2004 | Wang et al. .................... | 455/208 |
| 2004/0152418 | A1 | * | 8/2004 | Sinha et al. .................... | 455/42 |
| 2004/0240596 | A1 | * | 12/2004 | Liu ............................... | 375/350 |
| 2005/0164733 | A1 | * | 7/2005 | Sato ............................ | 455/553.1 |
| 2006/0121858 | A1 | * | 6/2006 | Tanaka et al. .................. | 455/91 |
| 2006/0229052 | A1 | * | 10/2006 | De Ruijter ..................... | 455/313 |
| 2006/0280270 | A1 | * | 12/2006 | Ibrahim et al. ................ | 375/354 |
| 2008/0096508 | A1 | * | 4/2008 | Luff .............................. | 455/209 |
| 2008/0181337 | A1 | * | 7/2008 | Maxim ......................... | 375/340 |

(Continued)

FOREIGN PATENT DOCUMENTS

| EP | 1 207 627 A1 | 5/2002 |
|---|---|---|
| EP | 1 791 311 A1 | 5/2007 |
| FR | 2 711 293 A1 | 4/1995 |

*Primary Examiner* — Emmanuel Bayard
(74) *Attorney, Agent, or Firm* — Sughrue Mion, PLLC

(57) ABSTRACT

The receiver (1) for FSK modulation signals includes an antenna (2) for receiving modulated data or control signals, a low noise amplifier (3) for amplifying and filtering the signals picked up by the antenna, a local oscillator (6) with a quartz resonator (7) for supplying high frequency, in-phase signals ($S_I$), and high frequency, in-quadrature signals ($S_Q$), first and second mixers (4, 5) for mixing the high frequency, in-phase and in-quadrature signals with the filtered and amplified incoming signals, in order to generate intermediate signals ($I_m$, $Q_m$), and a filtering unit (12) for filtering the intermediate signals. The receiver can be configured to receive modulated data or control signals at low rate. The filtering unit supplies intermediate signals ($I_F$, $Q_F$) filtered in a polyphase filter (13) to a first demodulation stage in medium or high rate mode, or intermediate, baseband signals filtered in the polyphase filter, which is converted into two low-pass filters (14, 15), to a second demodulation stage in low rate mode.

7 Claims, 1 Drawing Sheet

(56) References Cited

U.S. PATENT DOCUMENTS

2008/0182617 A1* 7/2008 Sato ..................... 455/552.1
2008/0318534 A1* 12/2008 Mak et al. ................ 455/91
2009/0215422 A1* 8/2009 Ikeda et al. ............. 455/313
2010/0255792 A1* 10/2010 Moloudi et al. ........... 455/73
2011/0053522 A1* 3/2011 Rofougaran et al. ....... 455/73

* cited by examiner

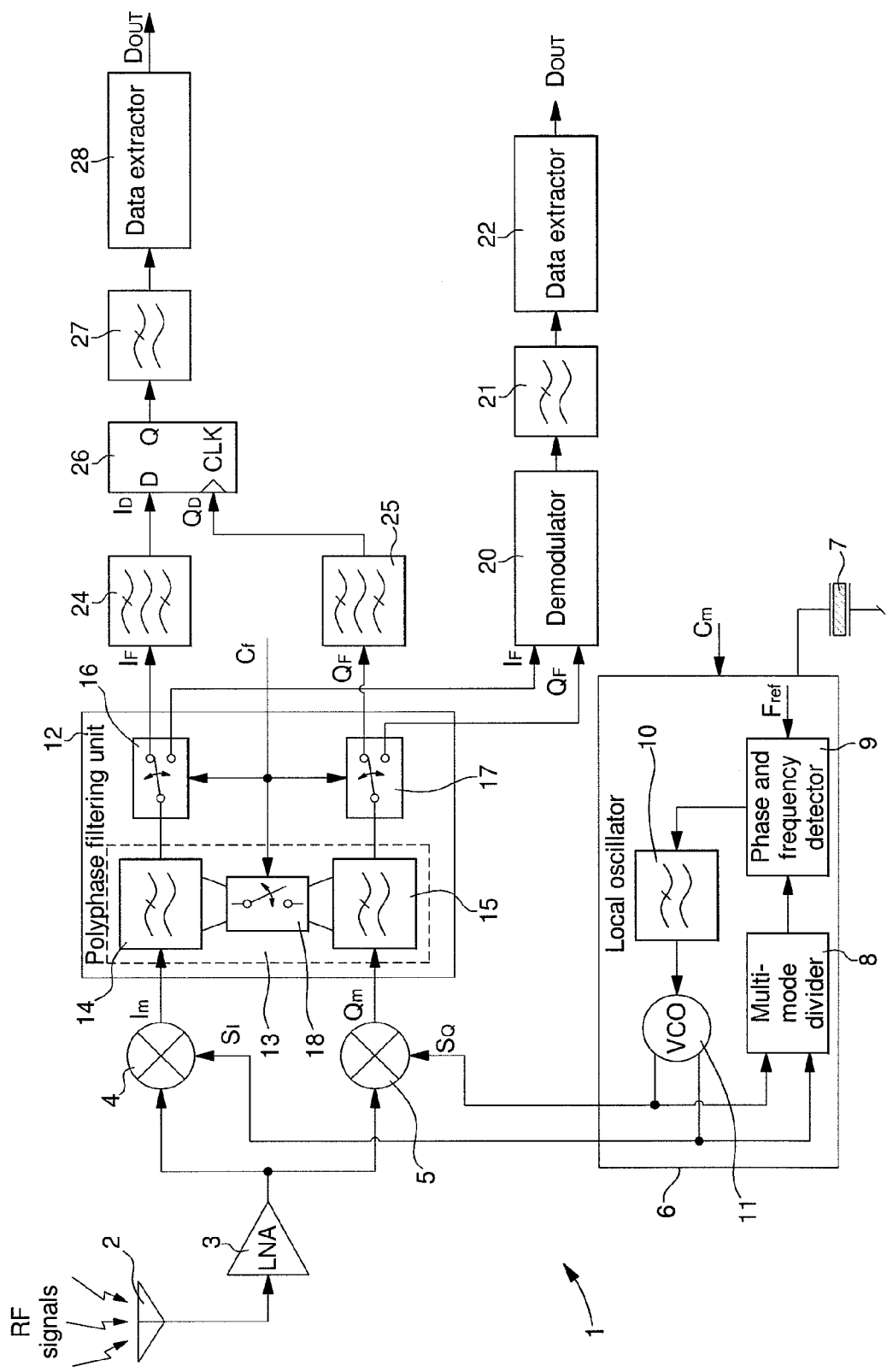

FSK MODULATION SIGNAL RECEIVER WITH HIGH SENSITIVITY IN LOW RATE MODE

This application claims priority from European Patent Application No. 09157506.8 filed Jul. 4, 2009, the entire disclosure of which is incorporated herein by reference.

FIELD OF THE INVENTION

The invention concerns a receiver for FSK modulation signals with high sensitivity in low rate mode.

BACKGROUND OF THE INVENTION

Usually, a transmitter or receiver uses FSK (Frequency Shift Keying) modulation for the short distance transmission or reception of data or commands. If the RF carrier frequency is high, for example more than 300 MHz, quite a high bandwidth is selected for the intermediate frequency, particularly more than or equal to 100 kHz. The modulation frequency shift in the modulated signals can be adapted in accordance with this bandwidth. In such case, a reference frequency can be used, supplied by a local oscillator, which is not very precise and thus inexpensive. However, account has to be taken of thermal noise power, which is proportional to the selected bandwidth. Thus, a broadband transmission or reception system generally has not excellent sensitivity.

FR Patent No. 2 711 293 discloses a radio-frequency signal receiver, whose bandwidth can be adapted. This superheterodyne type receiver is capable of demodulating both broadband frequency modulated signals, and narrow band signals. The bandwidth can be varied dynamically to obtain the best compromise between attenuation of distortion and attenuation of noise. After a first frequency conversion, a filter filters the intermediate signals with a first bandwidth (broadband). Next, another filtering operation is performed on the intermediate signals using a second bandwidth and a third bandwidth of filter for a narrow band. Finally, a discriminator performs demodulation.

However, no specific receiver configuration is performed in the receiver in accordance with the modulated data rate of the incoming data signals. Consequently, the dynamic bandwidth variation provides a good compromise between attenuation of distortion and attenuation of noise for the incoming signals. The structure of the receiver of this Patent document is also relatively complicated, which means that its electric power consumption cannot be sufficiently reduced for it to be mounted in a portable object of small size.

SUMMARY OF THE INVENTION

It is thus an object of the invention to provide a FSK modulation signal receiver that can operate with high sensitivity and can easily be configured in accordance with the modulated data or command rate in the modulated signals, while also overcoming the aforementioned drawbacks of the state of the art.

The invention therefore concerns a FSK modulation signal receiver, said low power receiver including:
an antenna for receiving modulated data or control signals,
at least one low noise amplifier for amplifying and filtering the signals picked up by the antenna,
a local oscillator with a quartz resonator, including, in a phase and frequency lock loop, a voltage controlled oscillator for supplying high frequency signals,
at least one mixer unit for mixing the incoming, filtered and amplified signals with the high frequency signals supplied by the voltage controlled oscillator to generate intermediate signals, whose frequency is equal to the difference between the high frequency signal frequency and a carrier frequency of the incoming signals, and
a filtering unit for filtering the intermediate signals for at least one data or control demodulation stage,
wherein the receiver can be configured for receiving modulated data or control signals at medium or high rate or for receiving modulated data or control signals at low rate, and wherein the filtering unit supplies intermediate signals filtered in a polyphase filter to a first demodulation stage in medium or high rate mode, or intermediate, baseband signals filtered in the polyphase filter, which is converted into at least one low-pass filter, to a second demodulation stage in low rate mode.

Particular embodiments of the receiver are defined in the dependent claims 2 to 7.

One advantage of the FSK modulation signal receiver according to the invention is that it can be configured both for receiving modulated data or commands in medium or high rate mode, and for receiving modulated data or commands in low rate mode. Preferably, the receiver is configured in the low rate mode, since the high sensitivity of said receiver facilitates the command and data demodulation operation. To achieve this, the filtering unit is operated so that it filters the intermediate signals in a polyphase filter for a first, medium or high rate, demodulation stage, or so that it filters the intermediate signals in baseband in two, uncoupled, low-pass filters in the polyphase filter for a second, low rate, demodulation stage.

Advantageously, in the low rate mode, the signals picked up by the antenna are directly converted by the mixers into intermediate, baseband signals. This simplifies data or command demodulation in low rate mode, since a simple D flip-flop can perform demodulation following narrow band bandpass filters centred at the frequency shift frequencies.

BRIEF DESCRIPTION OF THE DRAWINGS

The objects, advantages and features of the FSK modulation signal receiver will appear more clearly in the following description, based on at least one non-limiting embodiment illustrated by the drawing, in which:

FIG. 1 shows, in a simplified manner, one embodiment of the FSK modulation signal receiver according to the invention.

DETAILED DESCRIPTION OF THE PREFERRED EMBODIMENTS

In the following description, all those components of the frequency modulation (FSK) signal receiver that are well known to those skilled in this technical field are described merely in a simplified manner. Said FSK modulation signal receiver can advantageously be used, for example, in remote control systems for vehicles or in counting systems.

The FSK modulation signal receiver 1 shown in FIG. 1 can be configured to operate either in medium or high rate data or command reception mode more than or equal to 100 kbits/s, or, advantageously, in a highly sensitive, low rate data or command reception mode. In the preferred configuration with a low, modulated command or data rate of less than 10 kbits/s, for example around 1 kbits/s, the power of the incoming signals is generally concentrated at the (positive and negative) modulation frequency shift $\Delta f$ level relative to the signal carrier frequency $f_0$. Generally, in incoming signal frequency modulation, a "1" modulation state is defined by adding the carrier frequency $f_0$ to the modulation frequency shift $\Delta f$, which gives $f_0+\Delta f$, whereas a "0" modulation state is defined by subtracting the modulation frequency shift $\Delta f$ from carrier frequency $f_0$, which gives $f_0-\Delta f$. Of course, one could also imagine defining the "0" modulation state being as the carrier frequency $f_0$, even though data modulation at $f_0+\Delta f$ and $f_0-\Delta f$ is preferred.

FSK modulation signal receiver 1 includes an antenna 2, for receiving short distance RF signals, and whose carrier frequency may be more than or equal to 300 MHz. The FSK modulation RF signals picked up by antenna 2 are amplified in a low noise amplifier LNA 3. This low noise amplifier LNA 3 can also include a band-pass filter that is not shown. The amplified and filtered RF signals are frequency converted in a first mixer 4 by in-phase signals $S_I$ supplied by local oscillator 6 so as to provide intermediate in-phase signals $I_m$. These RF signals are also frequency converted in a second mixer 5 by in-quadrature signals $S_Q$ supplied by local oscillator 6 to provide intermediate in-quadrature signals $Q_m$. The first mixer 4 and the second mixer 5 form part of a mixer unit of the receiver.

FSK modulation signal receiver 1 includes an integrated circuit in which most of the receiver components are integrated. This integrated circuit may be made in 0.18 µm CMOS technology, for example.

Following mixers 4 and 5, the FSK modulation signal receiver also includes a polyphase filter unit 12, which can be configured in the form of low-pass filters 14 and 15 for filtering the intermediate signals in low rate mode, or in the form of a polyphase filter or band-pass filter 13 for filtering the intermediate signals in medium or high rate mode. After filtering unit 12, receiver 1 includes a first, medium or high rate demodulation stage, that receives the filtered, intermediate signals in medium or high rate mode, and a second, low rate demodulation stage that receives the filtered, intermediate signals in low rate mode.

In the second demodulation stage, receiver 1 includes two narrow band band-pass filters 24 and 25. These band-pass filters are centred on the modulation frequencies, particularly around the $+\Delta f$ and $-\Delta f$ frequency shift for filtering the filtered, intermediate signals $I_F$ and $Q_F$ in low rate mode. Following band-pass filters 24 and 25 there is a D flip-flop 26 for demodulating data or commands, a low-pass filter 27 and a data extractor 28 for supplying data or commands $D_{OUT}$. In the first demodulation stage, during selection of the medium or high rate mode, receiver 1 also includes a demodulator 20 for the data or commands contained in the intermediate, filtered signals $I_F$ and $Q_F$, followed by a low-pass filter 21 and a data extractor 22 for supplying data or commands $D_{OUT}$.

If medium or high rate mode is selected, intermediate, frequency converted signals $I_m$ and $Q_m$ are still at a frequency that may be, for example, around 1 MHz, with a modulation frequency shift $+\Delta f$, which may be around 250 kHz or less relative to the converted carrier frequency of 1 MHz. However, in low rate reception mode, the intermediate signals $I_m$ and $Q_m$ are converted directly into baseband at 0 Hz, given that the power of the incoming signals is concentrated at each modulation frequency shift $\Delta f$ level. Of course, direct frequency conversion into baseband cannot generally be envisaged for receiving FSK modulation signals at medium or high rate, since there is a lot of energy from the useful signals and noise over the entire frequency bandwidth. Data loss could be observed if direct baseband conversion were carried out at 0 Hz.

Local oscillator 6 of the receiver mainly includes a phase and frequency lock loop, which includes a voltage controlled oscillator VCO 11. The voltage controlled oscillator VCO may be a differential type oscillator so as to provide the two high frequency, in-phase and in-quadrature signals $S_I$ and $S_Q$. These in-phase and in-quadrature signals are supplied in the phase and frequency lock loop to a multi-mode divider 8. The divided frequency from divider 8 is compared in a phase and frequency detector 9 to a reference frequency Fref originating from a quartz oscillator 7. The output signal from the phase and frequency detector 9 is filtered in a low-pass filter 10 prior to controlling, in a known manner, the voltage controlled oscillator VCO.

If local oscillator 6 includes a precise quartz resonator 7, it is possible to make a FSK modulation signal receiver with high sensitivity in low rate mode (1 kbits/s), generally less than 10 kbits/s. For this rate, all the power in the incoming signals is concentrated at the frequency shift level, relative to carrier frequency $f_0$, namely $f_0+\Delta f$ and $f_0-\Delta f$. For this operating mode, precise quartz is necessary. Consequently, as indicated above, it is possible to frequency convert the incoming RF signals to obtain intermediate, in-phase and in-quadrature signals $I_m$ and $Q_m$ directly in baseband. However, for a medium or high rate FSK modulation signal receiver, quartz resonator 7 does not need to be precise, given that the power of the incoming signals with noise is roughly similar across the entire bandwidth of the receiver. The broader the bandwidth, the greater the thermal noise, which often means that a good compromise has to be found between bandwidth and thermal noise in order to demodulate data from the incoming FSK modulation signals without too many problems.

Receiver 1 can be configured in medium or high rate mode or in low rate mode for frequency conversion by means of a control signal Cm supplied to local oscillator 6. This control signal Cm allows the voltage controlled oscillator VCO 11 to supply in-phase signals $S_I$ and in-quadrature signals $S_Q$ that have a different frequency between the medium or high rate mode and the low rate mode. This control signal Cm can act on multi-mode divider 8 or even on reference frequency Fref of quartz oscillator 7. In low rate mode for example, the precise frequency of in-phase signals $S_I$ and in-quadrature signals $S_Q$ is identical to the carrier frequency $f_0$ of the RF signals picked up by antenna 2. This allows the incoming RF signals to be directly converted into baseband by first mixer 4 and second mixer 5. However, in medium or high rate mode, the frequency of in-phase signals $S_I$ and in-quadrature signals $S_Q$ is 1 MHz less, for example, than carrier frequency $f_0$ of the RF signals picked up by antenna 2. This means that intermediate signals $I_m$ and $Q_m$ can be obtained at a frequency of around 1 MHz, which then has to be demodulated in a demodulator 20.

One could also envisage configuring or setting the receiver, once the manufacturing steps for the integrated circuit of said receiver are finished, such that it can operate either in medium or high rate mode, or in low rate mode. Thus, with the same integrated circuit, it is possible to use the FSK modulation signal receiver either in medium or high rate mode, or in low rate mode, depending upon the configuration that has been set.

The FSK modulation signal receiver 1 includes still, as indicated above, a filtering unit with polyphase filter 12 for filtering the two intermediate signals $I_m$ and $Q_m$. This polyphase filtering unit 12 essentially includes a polyphase filter 13, which is formed of two, coupled, low-pass filters 14 and 15, wherein the first low-pass filter 14 receives intermediate, in-phase signals $I_m$, while the second low-pass filter 15 receives intermediate, in-quadrature signals $Q_m$. When the two low-pass filters 14 and 15 are coupled via a switch element 18, which is controlled by a control signal Cf to be closed when medium or high rate mode is selected, polyphase filter 13 can perform band-pass filtering around the intermediate signal carrier frequency. The cut-off frequency of this band-pass filtering can be defined, for example, at more or less 450 kHz from a central frequency, for example, of around 1 MHz, in accordance with the modulation frequency shift selected (Δf). This polyphase filter can be deemed to be a frequency shifted low-pass filter for generating filtered, intermediate in-phase $I_F$ and in-quadrature $Q_F$ signals.

It is noted that the coupling of the two low-pass filters 14 and 15 via switch element 18 could be defined instead by "gyrators". However, it is preferable for said coupling between the two low-pass filters to be achieved via a conventional switch element.

In medium or high rate mode, the filtered, intermediate signals $I_F$ and $Q_F$ are supplied via two switches 16 and 17, which are controlled by control signal Cf, to a demodulator 20 of the first, medium or high rate demodulation stage. This demodulator 20, which has a known structure, demodulates filtered, intermediate signals $I_F$ and $Q_F$ in medium or high rate mode. Demodulator 20 is followed by a low-pass filter 21 for removing all the stray frequencies from the data or control signals supplied by demodulator 20. The cut-off frequency of this low-pass filter can be adjusted in accordance with the modulated signal rate. Finally, a well-known data extractor is connected to the output of the low-pass filter for supplying data or control signals $D_{OUT}$.

Preferably, in low rate mode, polyphase filter 13 is converted into conventional low-pass filters 14 and 15, which are uncoupled via switch element 18 in an open state, controlled by control signal Cf. The intermediate, in-phase signals $I_m$, which are in baseband, are thus filtered by the first low-pass filter 14 to supply filtered, intermediate in-phase signals $I_F$ to a first band-pass filter 24 of the second, low rate demodulation stage. This first band-pass filter 24 has a narrow band centred on each frequency shift Δf or −Δf. The −Δf frequency shift is only an inverted phase Δf frequency shift, which facilitates demodulation via a simple D flip-flop 26, as explained below. The intermediate, in-quadrature signals $Q_m$, which are in baseband, are filtered by the second low-pass filter 15 to supply filtered, in-quadrature intermediate signals $Q_F$ to a second band-pass filter 25. This second band-pass filter also has a narrow band centred on each frequency shift Δf or −Δf. The filtered, intermediate signals $I_F$ and $Q_F$ are respectively supplied to first band-pass filter 24 and second band-pass filter 25 via, respectively, switches 16 and 17, controlled by control signal Cf in low rate mode.

The intermediate, in-phase data signals $I_D$ supplied by first band-pass filter 24 are connected to the D input of a D flip-flop 26, while the intermediate, in-quadrature data signals $Q_D$ supplied by second band-pass filter 25 are connected to the clock input CLK of said flip-flop 26. In this manner, the data or commands from the intermediate, baseband signals can easily be demodulated simply by using this D flip-flop 26. Of course, we could have envisaged supplying the intermediate, in-quadrature, data signals to the D input of said flip-flop and the intermediate, in-phase, data signals to the clock input CLK. Finally, the signals at the Q output of said flip-flop 26 are also filtered by a low-pass filter 27 that has a low cut-off frequency, adjusted in accordance with the modulated signal rate, before entering a data extractor 28, to supply data or control signals $D_{OUT}$.

It is clear from the foregoing that the main improvement of the FSK modulation signal receiver compared to receivers of the prior art is that it easily provides high sensitivity and facilitated demodulation when it is configured to receive data or control signals in low rate mode. Since the power of the data signals is mainly concentrated on the modulation frequency shift level, a narrow band-pass filter can be used to filter the intermediate signals in baseband, which facilitates data demodulation.

From the description that has just been given, several variants of the FSK modulation signal receiver can be devised by those skilled in the art without departing from the scope of the invention defined by the claims. Along the same lines, the receiver could also have been configured to allow modulated data signal transmission by the same antenna in medium or high rate mode or in low rate mode.

What is claimed is:

1. A receiver for FSK modulation signals, said receiver including:
    an antenna for receiving modulated data or control signals,
    at least one low noise amplifier for amplifying and filtering the signals picked up by the antenna,
    a local oscillator with a quartz resonator, including, in a phase and frequency lock loop, a voltage controlled oscillator for supplying high frequency signals,
    at least one mixer unit for mixing the incoming, filtered and amplified signals with the high frequency signals supplied by the voltage controlled oscillator to generate intermediate signals, whose frequency is equal to the difference between the high frequency signal frequency and a carrier frequency of the incoming signals, and
    a filtering unit for filtering the intermediate signals for at least one data or control demodulation stage,
    wherein the receiver can be configured for receiving modulated data or control signals at medium or high rate or for receiving modulated data or control signals at low rate, and wherein the filtering unit supplies intermediate signals filtered in a polyphase filter to a first demodulation stage in medium or high rate mode, or intermediate, baseband signals filtered in the polyphase filter, which is converted into at least one low-pass filter, to a second demodulation stage in low rate mode.

2. The receiver according to claim 1, wherein the voltage controlled oscillator of the local oscillator supplies high frequency in-phase signals to a first mixer of the mixer unit to mix said signals with the filtered and amplified incoming signals in order to obtain intermediate, in-phase signals, and high frequency in-quadrature signals to a second mixer of the mixer unit, to mix said signals with the filtered and amplified incoming signals in order to obtain intermediate, in-quadrature signals, wherein in medium or high rate mode, the polyphase filter of the filtering unit includes two, coupled, low-pass filters in order to supply filtered, intermediate in-phase and in-quadrature signals to the first demodulation stage, and wherein in low rate mode, the two low-pass filters of the polyphase filter of the filtering unit are uncoupled so that a first low-pass filter supplies filtered, intermediate, baseband, in-phase signals to the second demodulation stage, and so that a second low-pass filter supplies intermediate, filtered, baseband, in-quadrature signals to the second demodulation stage.

3. The receiver according to claim 1, wherein the voltage controlled oscillator of the local oscillator with a quartz resonator is configured, in medium or high rate mode, to supply high frequency, in-phase and in-quadrature signals at a first frequency that is lower or higher than a carrier frequency of the filtered and amplified incoming signals, so that the intermediate, in-phase and in-quadrature signals are at an intermediate frequency that corresponds to the difference between the frequency of the high frequency signals and the carrier frequency, and wherein the voltage controlled oscillator is configured, in low rate mode, to supply high frequency, in-phase and in-quadrature signals at a second frequency, identical to the carrier frequency of the filtered and amplified incoming signals, to supply intermediate, baseband, in-phase and in-quadrature signals.

4. The receiver according to claim 2, wherein in low rate mode, the second demodulation stage includes a first band-pass filter for filtering the intermediate, filtered, baseband, in-phase signals and a second band-pass filter for filtering the intermediate, filtered, baseband, in-quadrature signals, wherein each band-pass filter is centred on the data or control modulation frequencies after frequency conversion into baseband of the intermediate signals.

5. The receiver according to claim 4, wherein each band-pass filter has a narrow band centred on each positive and negative modulation frequency shift.

6. The receiver according to claim 4, wherein the second, low rate, demodulation stage further includes a D flip-flop, wherein one of the intermediate, baseband signals, filtered by the two band-pass filters is supplied to the D input of said flip-flop, while the other intermediate, baseband signal is supplied to a clock input of said flip-flop.

7. The receiver according to claim 6, wherein the second, low rate demodulation stage further includes another low-pass filter for filtering the data or control signals supplied by the D flip-flop, and a data extractor, connected at output of the other low-pass filter.

* * * * *